United States Patent [19]

Hurrell, II et al.

[11] Patent Number: 5,094,263

[45] Date of Patent: Mar. 10, 1992

[54] TIRE PRESSURE MANAGEMENT ACTUATOR WITH BYPASS LEAKAGE PREVENTION

[75] Inventors: George L. Hurrell, II, Port Clinton; Chad E. Law, Huron; Ellen C. Stanton, Butler, all of Ohio

[73] Assignee: General Motors Corporation, Detroit, Mich.

[21] Appl. No.: 739,571

[22] Filed: Aug. 2, 1991

[51] Int. Cl.⁵ .................... B60C 23/00; F16K 15/20; F16K 31/363
[52] U.S. Cl. .................. 137/224; 251/63.4; 251/63.6; 152/416; 152/427
[58] Field of Search ............. 137/223, 224; 251/63.4, 251/63.5, 63.6; 152/415, 416, 417, 418, 427

[56] References Cited

U.S. PATENT DOCUMENTS 2,489,397  11/1949  Brummer .................... 137/224
2,685,906   8/1954  Williams ..................... 152/417
2,976,906   3/1961  Kamm et al. ................ 152/417
3,249,144   5/1966  Dobrikin ..................... 152/415
4,932,451   6/1990  Williams et al. ............ 152/417
4,938,272   7/1990  Sandy, Jr. et al. .......... 152/427

FOREIGN PATENT DOCUMENTS 2544555  4/1977  Fed. Rep. of Germany ...... 137/224
2328585  5/1977  France ........................... 137/224

Primary Examiner—John Rivell
Attorney, Agent, or Firm—Patrick M. Griffin

[57] ABSTRACT

A piston type TPM actuator valve has enough clearance between the piston and the wall of the cylindrical passage that it slides to prevent sticking, but still avoids excessive bypass leakage through the same clearance. A plug located in the passage between the piston and the check valve has a vent to atmosphere that prevents leaking air from compressing behind the advancing piston. The plug also carries a seal that is compressed when the piston bottoms out to prevent further venting.

2 Claims, 3 Drawing Sheets

TIRE PRESSURE MANAGEMENT ACTUATOR WITH BYPASS LEAKAGE PREVENTION

This invention relates to actuator valves for tire pressure management systems in general, and specifically to a valve of the piston type that reduces bypass leakage of pressurized air.

BACKGROUND OF THE INVENTION

Vehicle tire pressure management systems that actively pump pressurized air to the tires need an actuator valve to make and break the connection from the compressor to the tire. A spring loaded check valve of the type typically found in a tire stem is an available, proven means of opening and blocking a passage into the tire interior. Therefore, an actuator that incorporates such a check valve, and can open and close it on command, is a logical choice. A typical means to open and close the check valve is a spring returned piston that is pushed forward by the air pressure, and pops back when the pressure is removed. Such an actuator is simple, because it operates passively in response to the same pressurized air used to inflate the tire. However, air must not be allowed to accumulate and compress ahead of the piston as it moves, or its forward motion would be retarded. Therefore, a vent passage to atmosphere is provided behind the piston. The motion of the piston would also be retarded if the interface between the piston and the cylindrical passage that it slides in were too tight. If there is too much sliding clearance, however, then a good deal of pressurized air can leak past the piston and out the vent to atmosphere, which is wasted work by the compressor. This is known as bypass leakage. These competing concerns mean that the manufacturing tolerances of the piston and passage must be tightly held, which is expensive.

SUMMARY OF THE INVENTION

The invention provides a piston type actuator in which the piston clearance can be left relatively loose for easy sliding, but which does not have excessive bypass leakage.

The actuator valve includes a main body that is threaded into the rim of a tire, with a cylindrical central passage that opens to the tire interior and to the pressurized air supply. A spring loaded check valve located in the valve body blocks the central passage when closed, and allows flow through it when open. A spring return piston located above the check valve slides toward the check valve to open it and back as air pressure is applied and removed. A stem on the piston actually engages the check valve to push it open, sliding through a plug located between the underside of the piston and the check valve. The clearance between the edge of the piston and the surface of the central passage is sufficient to allow the piston to slide easily, and thus cannot totally prevent pressurized air from leaking past. To prevent air from compressing between the underside of the piston and the plug, which would interfere with free sliding of the plug, an atmospheric vent is formed through the plug. The vent opens into the space between the underside of the piston and the plug at a point close to the stem. In the embodiment disclosed, the plug is formed from two disks that fit together in such a way as to allow the atmospheric vent to be easily made. Outboard of the vent opening is a circular seal carried by the plug that is compressed between the underside of the piston and the plug when the piston is in the on-position.

When pressurized air is supplied to the upper side of the piston, it slides freely, because of the edge clearance referred to above. There is bypass leakage into the space between the underside of the piston and the plug, but this escapes through the atmospheric vent. In the short time necessary for the piston to bottom out, little air is lost. When the piston does bottom out, compression of the continuous seal totally prevents any more bypass leakage from reaching the atmospheric vent, which is surrounded by the seal. When the pressurized air is removed, the check valve spring returns closed and the piston spring returns to the off-position.

It is, therefore, a general object of the invention to provide a piston type actuator valve for a tire pressure management system that slides easily, but which does not suffer undue bypass leakage.

It is another object of the invention to provide such an actuator valve in which the piston has enough clearance to move easily, which allows significant bypass leakage for a short time, but compresses a seal at the end of its stroke to stop the bypass leakage.

It is yet another object of the invention to provide such an actuator in which the atmospheric vent that prevents compressed air from backing up the piston, and which vents any bypass leakage, is inboard of and surrounded by an O-ring seal that is compressed when the piston bottoms out, preventing any further leakage.

It is still another object of the invention to provide a plug made up of two parts that allow the atmospheric vent to be easily formed.

DESCRIPTION OF THE PREFERRED EMBODIMENT

These and other objects and features of the invention will appear from the following written description, and from the drawings, in which:

FIG. 8 shows the piston bottomed out and fully on.

Figure 1:
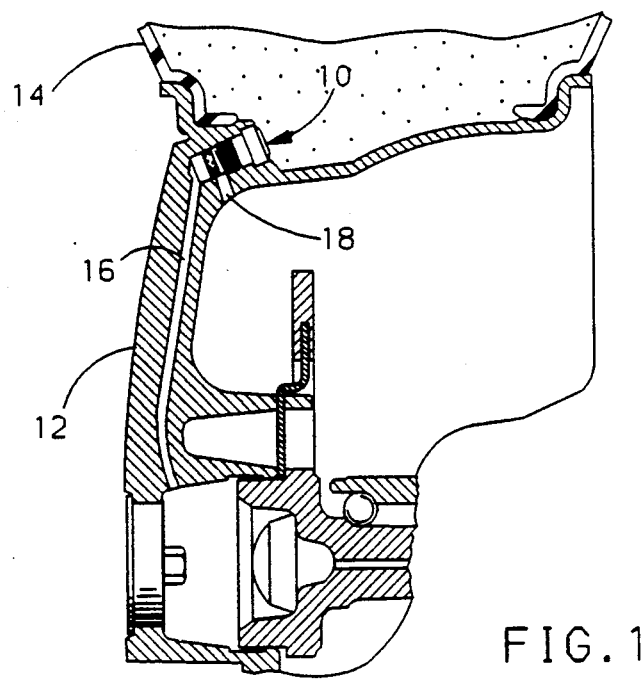
FIG. 1 is a cross section of part of a vehicle wheel and tire bead showing a preferred embodiment of the the actuator valve of the invention installed in a wheel.
Figure 2:
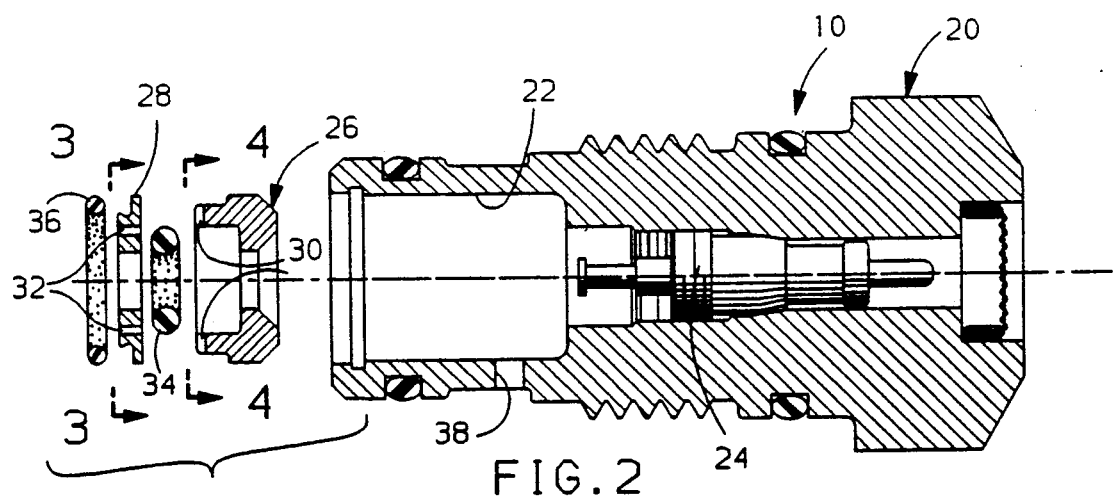
FIG. 2 is an exploded cross section of the various parts of the valve disassembled, with the check valve shown in elevation.
Figure 3:
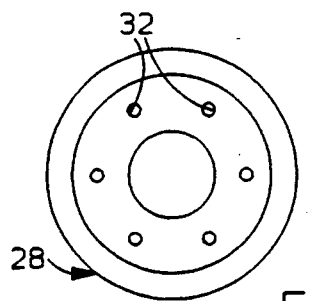
FIG. 3 is a view from the perspective of line 3—3 of FIG. 2 showing one of the components of the plug.
Figure 4:
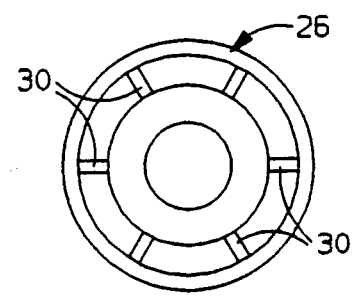
FIG. 4 is a view from the perspective of line 4—4 of FIG. 2 showing one of the other components of the plug.

Referring first to FIG. 1, a preferred embodiment of the actuator valve of the invention, indicated generally at 10, is incorporated in the rim of a vehicle wheel 12, near the interior of a tire 14. A conventional command and control system would send pressurized air from a compressor through a passage 16 in wheel 12 to valve 10, and ultimately to the interior of tire 14. Or, excess pressure could be relieved from tire 14. In either event, valve 10 is the last point in the air path to tire 14, and has to positively make and break the connection, allowing no air to escape when off, and, preferably, losing as little air as possible when on. An outlet 18 to atmosphere allows any air that is lost as valve 10 operates to escape.

The volume of lost air is minimized by the structure described next.

Figure 5:
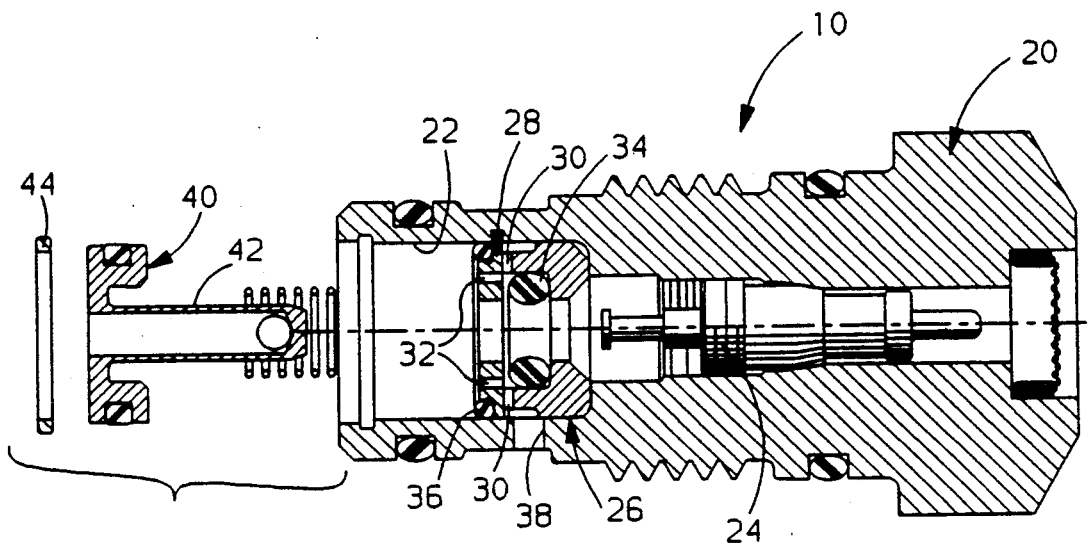
FIG. 5 shows the valve assembled but for the piston.

Referring next to FIGS. 2 through 5, the various components that make up valve 10 are illustrated. A valve body 20 of aluminum or other light weight metal is threaded through the rim of wheel 12. A central passage 22 through body 20 has the shape of a stepped cylinder, with a dotted line central axis about which other components are arranged. Threaded tightly into the approximate center of passage 22 is a standard spring loaded check valve 24 of the type typically found in tire stems. Check valve 24 allows flow to proceed through passage 22 if open, and securely blocks it when closed. The remaining components of actuator valve 10 serve to open and close check valve 24. A plug is made up of two abuttable parts, an axially inner annular disk 26 and axially outer annular disk 28. Inner disk 26 has a thinned upper rim with a series of six evenly spaced notches 30, while outer disk 28 has a series of six evenly spaced holes 32 drilled through it near the inner diameter. Inner disk 26 holds a small diameter O-ring 34 at its inner diameter, while the upper surface of outer disk 28 holds a larger diameter O-ring 36 near its outer edge. After check valve 24 is threaded in place, the two disks 26 and 28 are stacked snugly into the stepped central passage 22 just above check valve 24, as shown in FIG. 5. The holes 32 open to the notches 30 in the thinned down upper edge of disk 28 to create a continuous flow path that opens through an outlet 38 drilled through the side of valve body 20. The smaller O-ring 34 is not tight to the underside of outer disk 28, and so does not block the six holes 32. The larger O-ring 36 is snug to the surface of central passage 22 but, more significantly is radially outboard of the six holes 32, for a purpose described below.

Figure 6:
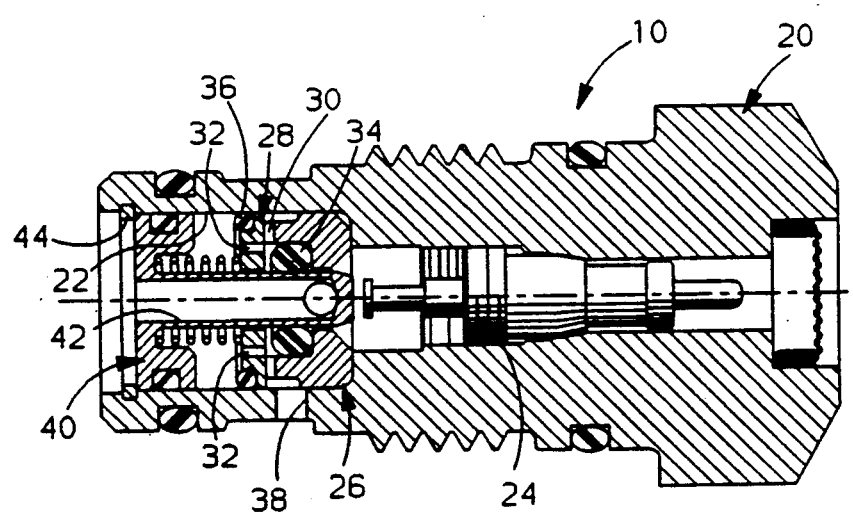
FIG. 6 shows the valve totally assembled, before installation.

Referring next to FIGS. 5 and 6, the further assembly of valve 10 is illustrated. With the disks 26 and 28 in place, a spring loaded piston 40 with a hollow central stem 42 is added, held in place by a snap ring 44. The piston stem 42 fits slidably through the aligned centers of the stacked disks 26 and 28, and, in the off-position, the end of stem 42 is axially spaced from check valve 24. The fit of stem 42 through the disks 26 and 28 and through the smaller O-ring 34 is close, but not close enough to restrict sliding. The outer edge of piston 40 itself fits closely within the surface of central passage 22, but, again with enough clearance to allow free sliding. Since the edge of piston 40 is much larger in diameter than the outer surface of stem 42, and farther removed from the central axis, it is more likely to cock and become stuck within passage 22 than the stem 42 is prone to stick as it slides through the disks 26 and 28. Therefore, the edge clearance may have to be larger, and the potential for bypass leakage at the sliding interface between the edge of piston 40 and the inner surface of central passage 22 is consequently greater. This is minimized by the larger O-ring 36, as described next.

Figure 7:
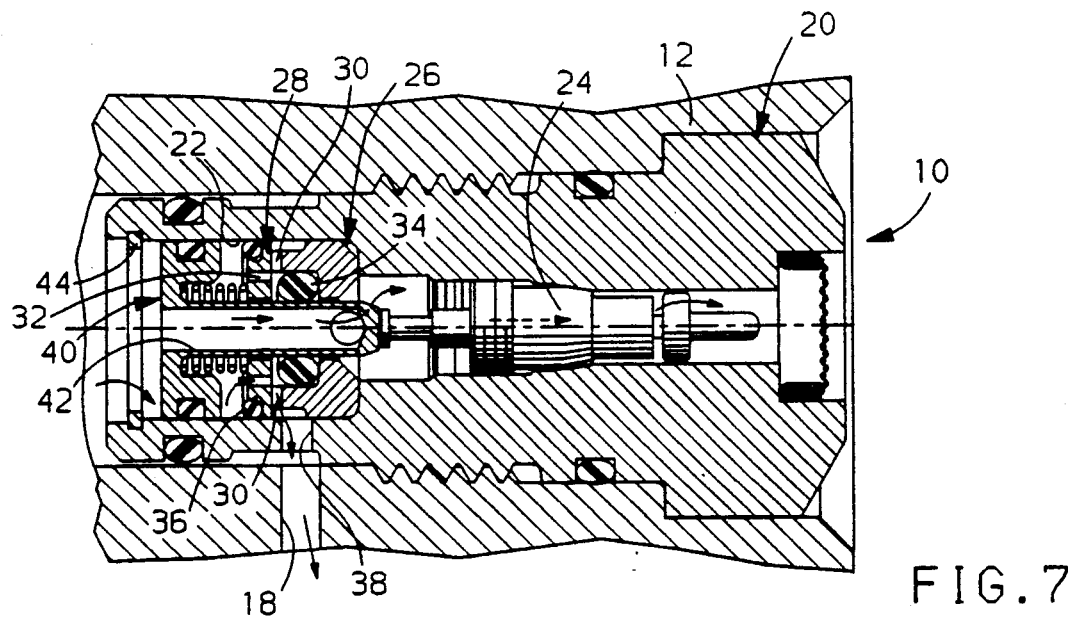
FIG. 7 shows the installed valve with the piston moved partially toward the on-position.

Referring next to FIG. 7, the operation of actuator valve 10 is illustrated. When the assembled valve 10 is threaded into the rim of wheel 12, the outlets 18 and 38 are aligned. Therefore, there is a complete flow path created beneath piston 40 from a point radially near the surface of the stem 42 to atmosphere. When pressurized air is supplied to the upper side of piston 40, it is pushed in from the off-position until stem 42 hits and begins to open check valve 24. As shown by the flow arrows, pressurized air can then travel down the hollow stem 42 and through the now open check valve 24 to the interior of tire 14. But, air can also escape past the edge of piston 40, because of the free sliding clearance, as noted above. The leaking air has a free path through the holes 32 and the notches 30 and out the aligned outlets 18 and 38. Consequently, air does not compress and form an interfering cushion behind the advancing piston 40. The sliding of the stem 42 tends to drag the O-ring 34 away from the holes 32, so that the vent path stays clear.

Figure 8:
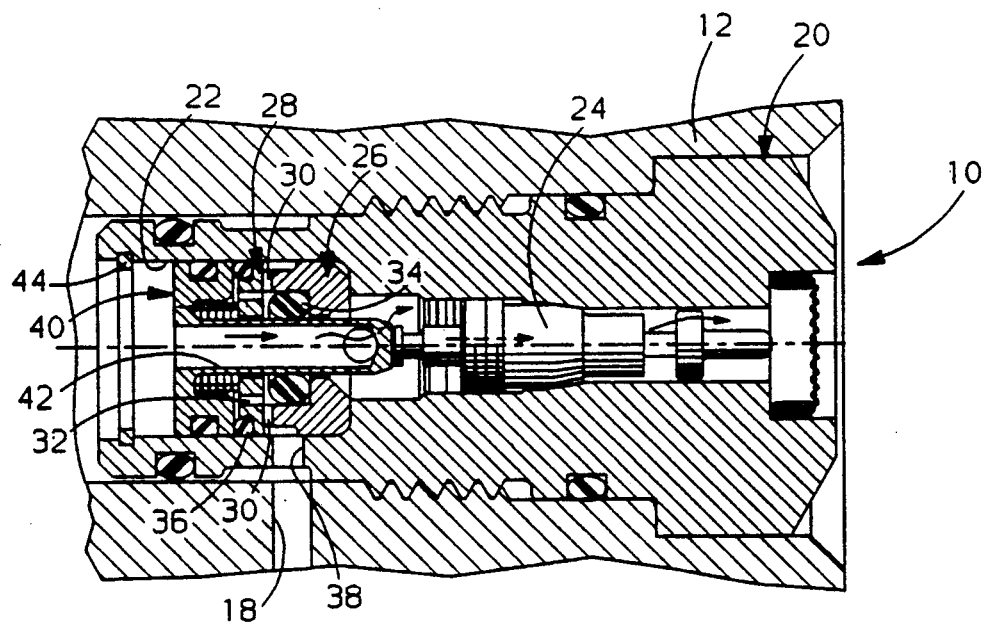

Referring next to FIG. 8, piston 40 continues to advance until it bottoms out on the top of outer disk 28. This defines the fully on-position of piston 40. Check valve 24 is pushed farther open, and the larger O-ring 36 is compressed between the underside of piston 40 and the outer disk 28. At that point, air leaking past the edge of piston 40 cannot reach the holes 32, which are completely surrounded by the seal provided by the compressed O-ring 36. Pressurized air can flow only through the stem 42 and to the check valve 24, or vice versa, if it is desired to deflate tire 14. There is little opportunity for backflow along the interface between the outside of stem 42 and the disks 26 and 28, because of the close fit described above. In addition, the smaller O-ring 34 will have been dragged down by the sliding of stem 42 to help block that potential leak path. With the removal by the command and control system of the air pressure holding piston 40 down, both it and the check valve 24 pop back under the force of their internal springs, and tire 14 is positively sealed once again.

Variations in the disclosed embodiment could be made. The plug provided by the stacked disks 26 and 28 could be made as a solid, single piece. The two functions that the plug provides are a stop surface for piston 40 to bottom out on, and a physical segregating of the check valve 24 from piston 40, so that a vented chamber can be created beneath piston 40. Such a solid piece would have to be carefully cross drilled to provide the vent to atmosphere. On the other hand, the two stacked disks 26 and 28 create the effect of a cross drilled passageway with the simply machined holes 32 and notches 30. In addition, the stacked disks 26 and 28 conveniently house the smaller O-ring 34 between them. The smaller O-ring 34 could be eliminated in favor of machining a closer tolerance between the stem 42 and the inner disk 26. However, the smaller O-ring 34 provides an enhanced seal, and cooperates with the sliding piston stem 42, which drags it away from the holes 32, as noted above. The larger O-ring 36 could be carried by either the outer disk 28 or by the underside of the piston, so long as it is located radially outboard of the vent point where the holes 32 are drilled through outer disk 28. Therefore, it will be understood that it is not intended to limit the invention to just the embodiment disclosed.

The embodiments of the invention in which an exclusive property or privilege is claimed are defined as follows:

1. An actuator valve for a tire pressure management system that selectively feeds pressurized air to the interior of a tire, said valve comprising,
   a valve body with a cylindrical central passage opening both to said pressurized air and to the interior of said tire,
   a spring loaded check valve tightly received in said central passage that blocks said central passage when closed and allows airflow through when opened,
   a spring loaded piston slidably received within said passage above said check valve that slides from an off-position toward said check valve to an on-position when said pressurized air is supplied and off again when said pressurized air is removed, said piston engaging the surface of said central passage with sufficient clearance to allow unrestricted sliding, but not closely enough to prevent the leakage of pressurized air between said piston and central passage surface, a stem carried by said piston and engageable with said check valve to open it and allow the passage of pressurized air to said check valve and to said tire interior as said piston moves to the on-position, a stationary plug in said central passage between said check valve and piston through which said stem extends that is normally axially spaced from said piston but abuts said piston in its on-position, said plug having a vent path running from atmosphere into the space between said plug and piston at a vent point radially near said stem so that pressurized air leaking past said piston as it moves will not compress between said plug and piston to retard its motion, and, a circular compression seal surrounding said vent point that is compressed between said piston and plug when they are abutted so that pressurized air leaking past said piston can not vent to atmosphere when said check valve is open.

2. An actuator valve for a tire pressure management system that selectively feeds pressurized air to the interior of a tire, said valve comprising, a valve body with a cylindrical central passage opening both to said pressurized air and to the interior of said tire, a spring loaded check valve tightly received in said central passage that blocks said central passage when closed and allows airflow through when opened, a spring loaded piston slidably received within said passage above said check valve that slides from an off-position toward said check valve to an on-position when said pressurized air is supplied and off again when said pressurized air is removed, said piston engaging the surface of said central passage with sufficient clearance to allow unrestricted sliding, but not closely enough to prevent the leakage of pressurized air between said piston and central passage surface, a stem carried by said piston and engageable with said check valve to open it and allow the passage of pressurized air to said check valve and to said tire interior as said piston moves to the on-position, an outer annular disk and an inner annular disk abutted in said central passage to form a plug between said check valve and piston through which said stem extends, said piston being normally axially spaced from said outer disk but abutted therewith in its on-position, said outer disk having a series of holes radially close to said stem opening to a series of notches in said inner disk to create a vent path running from atmosphere into the space between said plug and piston so that pressurized air leaking past said piston as it moves will not compress between said plug and piston to retard its motion, and, a circular compression seal surrounding said holes that is compressed between said piston and plug when they are abutted so that pressurized air leaking past said piston cannot vent to atmosphere when said check valve is open.

* * * * *